United States Patent [19]

Schulz

[11] Patent Number: 4,658,598
[45] Date of Patent: Apr. 21, 1987

[54] APPARATUS FOR VENTILATING AND AIR-CONDITIONING DRIVER COMPARTMENTS

[75] Inventor: Joachim Schulz, Amorbach, Fed. Rep. of Germany

[73] Assignee: Aurora Konrad G. Schulz GmbH & Co., Mudau/Odenwald, Fed. Rep. of Germany

[21] Appl. No.: 851,124

[22] Filed: Apr. 11, 1986

[30] Foreign Application Priority Data

May 2, 1985 [DE] Fed. Rep. of Germany ....... 3515853

[51] Int. Cl.$^4$ ............................................ B60H 1/32
[52] U.S. Cl. .................................... 62/239; 98/2.14; 98/2.15; 62/244; 62/DIG. 16; 165/41
[58] Field of Search ................. 62/239, 244, DIG. 16; 98/2.14, 2.15; 165/41

[56] References Cited

U.S. PATENT DOCUMENTS 3,315,488  4/1967  Lind .......................... 62/DIG. 16
3,885,398  5/1975  Dawkins ..................... 62/243 X
4,217,764  8/1980  Armbruster ................. 62/239 X Primary Examiner—Lloyd L. King
Attorney, Agent, or Firm—Becker & Becker, Inc.

[57] ABSTRACT

An apparatus for ventilating and air-conditioning driver compartments, cabs, or the like. A base plate is provided that closes off a space formed by the roof construction and the base plate. Disposed in this space is a partition that extends at a right angle to the base plate and is disposed transverse to the direction of flow so as to divide the entire space. The partition is associated with an evaporator, and has an aperture, the dimensions of which are adapted to the air passage cross-section of the evaporator.

13 Claims, 3 Drawing Figures

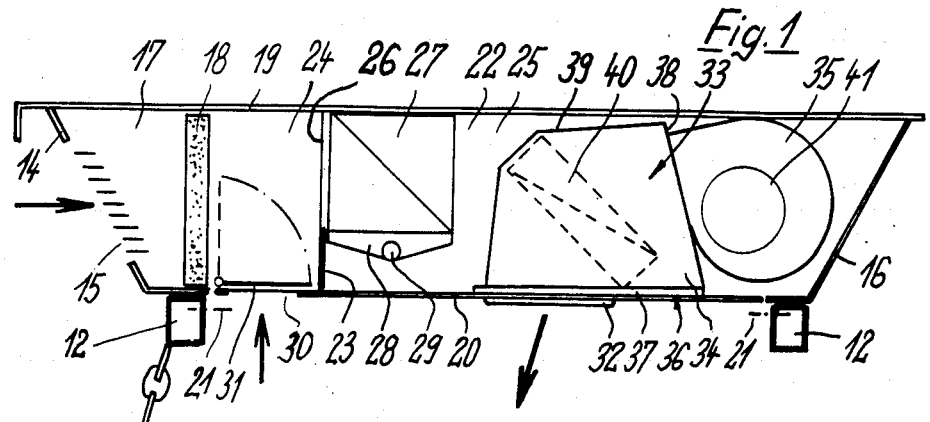
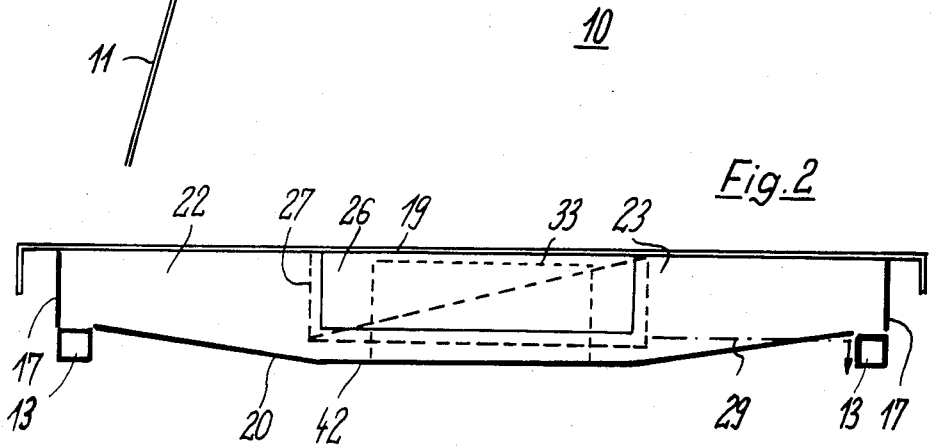
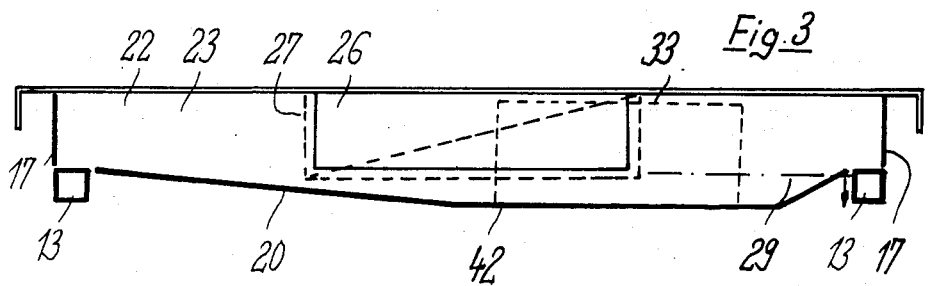

APPARATUS FOR VENTILATING AND AIR-CONDITIONING DRIVER COMPARTMENTS

Background of the Invention

The present invention relates to an apparatus for ventilating and air-conditioning driver compartments, cabs, or the like of prime movers, tractors, construction machinery, etc. The apparatus includes an air inlet area, downstream of which are provided an evaporator of an air-conditioning unit, a fan, and possibly a heat exchanger that can, for example, be connected to the coolant circulation of an internal combustion engine. The apparatus can be secured to the roof construction of the driver compartment, and is provided with air outlet openings that lead to the latter.

With apparatus of this type, it is known to dispose the evaporator, the fan, and possibly the heat exchanger in a housing having a bottom, a cover, and side walls that are provided with air inlet and air outlet openings. In addition, passages for hoses or conduits are provided in the side walls; these passages are connected to the evaporator and possibly to the heat exchanger. The thus-formed unit is secured to the roof construction of the driver compartment. Especially with arched roofs and roofs that have an otherwise irregular design, there results the drawback that the roof space is not optimally used. For examle, with heretofore known arrangements, the apparatus frequently projects too far into the driver compartment, thereby reducing the free space available for the movement of the operator, and possibly even results in the danger of an accident. Moreover, hoses and conduits must be guided from the housing to the side walls of the driver compartment; this also has a disruptive effect, especially since the drainage pipe of the water trap of the evaporator must have a sufficient fall or drop.

In contrast, it is an object of the present invention to provide an apparatus for ventilating and air-conditioning driver compartments, cabs, or the like, according to which the evaporator of the air-conditioning unit can be disposed in the highest region of the roof construction, with the space required for the apparatus being reduced to a minimum.

BRIEF DESCRIPTION OF THE DRAWING

This object, and other objects and advantages of the present invention, will appear more clearly from the following specification in conjunction with accompanying schematic drawing, in which:

FIG. 1 shows one exemplary embodiment of the inventive apparatus having a base plate within the roof construction of a driver compartment;

FIG. 2 shows a partition in conjunction with a symmetrically shaped base plate; and FIG. 3 shows a partition in conJunction with an asymmetrically shaped base plate.

SUMMARY OF THE INVENTION

The apparatus of the present invention is characterized primarily in that it is provided with a base plate that closes off the space formed by the roof construction and the base plate; the apparatus is further characterized by a partition that extends at a right angle to the base plate, with the partition being disposed transverse to the direction of flow so as to divide the entire space. The partition is associated with the evaporator, and is provided with an aperture, the dimensions of which are adapted to the air passage cross-section of the evaporator.

With the apparatus of the present invention, there is achieved the advantage that the entire space that is surrounded by the roof construction and the base plate is available for accommodating the devices of the apparatus for ventilating, air-conditioning, and possibly heating of the driver compartment. The material expenditure for the housing is practically limited to the base plate, especially since the roof construction, along with its crosspieces and the roof, already form a closed space. This space is divided by the partition transverse to the direction of flow, and the evaporator of the air-conditioning unit is associated directly with an aperture in the partition; the evaporator can be secured directly to the partition. This makes it possible to dispose not only the aperture but also the evaporator directly below the roof, so that within the roof construction, i.e. above the base plate, sufficient drop is still available for the discharge of water of condensation from the water trap of the evaporator.

A further advantage of the inventive apparatus is that the peripheral dimensions of the partition are initially greater than the overall cross-section of the space formed by the roof construction and the base plate, and the edge of the partition is adapted to the cross-section of the apparatus only upon installation of the apparatus into the roof construction. As a result, the apparatus can be adapted individually to different roof constructions of driver compartments. The aperture in the partition is preferably open toward the top in the direction of the roof, thus always assuring that the evaporator is also disposed in the highest region of the roof construction. This makes it possible to also move the base plate relatively close to the roof, resulting in a flatter space for accomodating the apparatus. At the same time, this also increases the head room for the operator in the driver compartment.

Further advantageous features of the present invention will be described in detail subsequently.

DESCRIPTION OF PREFERRED EMBODIMENTS

Referring now to the drawing in detail, FIG. 1 illustrates in longitudinal cross-section the roof construction of a driver's cab having an inside compartment 10 for the driver, and a windshield 11. The roof construction rests upon crosspieces 12 and longitudinal members 13. Disposed above these support members are a front wall 14 (possibly having a fresh air inlet grill 15), a rear wall 16, and side walls 17. If a fresh air inlet grill 15 is provided, a filter 18 can be disposed downstream of the grill. A roof 19 is secured to the upper edges of the end walls 14 and 16, as well as of the side walls 17. In the illustrated embodiments, this roof 19 is flat. However, it can also be arched or raised in some other fashion in the center. Disposed between the crosspieces 12 and the longitudinal members 13 is a base plate 20 that extends parallel to the roof 19 and at a distance therefrom. The base plate 20 can be installed from the inside compartment 10, and is held in place by retaining elements 21, such as spring-loaded pins, clamps, etc.

Disposed between the roof 19 and the base plate 20 is a closed-off space 22 that is divided by a partition 23 into an air inlet area 24 and an air handling area 25. The partition 23 is provided with an aperture 26, the dimensions of which are adapted to the air passage cross-section of an evaporator 27 which, in the direction of flow, is secured to the partition 23 immediately behind the aperture 26. It is also possible to mount the evaporator 27 directly to the roof 19, or to support the evaporator on a bracket disposed on the base plate 20. Disposed below the evaporator 27 is a water trap 28 for collecting water of condensation, which can be withdrawn via a conduit 29.

The partition 23 is disposed at a right angle relative to the base plate 20. In addition, the partition 23 can be securely connected to the base plate 20. The free edge of the partition 23 forms a flow-proof seal relative not only to the base plate 20, but also to the side wall 17 and the roof 19. For this purpose, when the partition 23 is manufactured it is provided with peripheral dimensions that are greater than the overall cross-section of the space 22. Only when the inventive apparatus is installed is the edge of the partition cut to size, so that the partition 23 can conform precisely to the cross-section of the roof construction. The partition 23 can be made, for example, of glass-fiber-reinforced polyester, vacuum-drawn plastic, aluminum sheet, or plywood. As can be seen in FIGS. 2 and 3, the aperture 26 in the partition 23 is open toward the top, so that the evaporator 27 can be disposed directly below the roof 19. Having an aperture 26 that is open toward the top also facilitates adaptation of the partition 23 to any roof shape.

The sealing in the region of the free peripheral edge of the partition 23 can also be achieved by lining the roof construction with foam material (not illustrated). Such a foam lining at the same time has the advantage that the peripheral edge of the base plate 20 can be sealingly disposed at the ends of the foam lining.

In the embodiment illustrated in FIG. 1, the base plate 20 is provided with an inlet opening 30 for return air in the region of the front crosspiece 12; this inlet opening 30 can be closed off by a flap 31. The flap 31 is disposed directly behind the filter 18 within the air inlet area 24. The dimensions of the flap 31 on the outlet side of the filter 18 can aso be such that the mixture ratio of fresh air to return air can be preset. The mixture ratio can also be controlled thermostatically. The fresh air inlet opening 15 and the return air inlet opening 30 can also be provided as alternatives.

When viewed in the direction of flow, the partition 23 is disposed directly downstream of the air inlet area 24. In this way, the evaporator 27 of the air-conditioning unit can directly receive return air and/or fresh air.

The cold air exiting the evaporator 27 can be guided directly into the inside compartment 10 from the air handling area 25 via air discharge nozzles 32 in the base plate 20. The force of the air flow can be regulated by control members at the air discharge nozzles 32.

However, in the embodiment illustrated in FIG. 1, there is provided within the air handling area 25 a unit 33 that comprises a one-piece shell 34 and a fan 35. The shell 34 is a one-piece molded plastic part, and is provided with an open base 36 that is surrounded by a flange 37 via which the shell 34 is sealingly secured to the base plate 20 in such a way that only the interior of the shell 34 communicates with the air discharge nozzles 32. In the direction of the head or surface 39, the shell 34 is provided with converging end walls and side walls, with the radial-flow fan 35 being secured to the side wall 38, which is inclined relative to the base plate 20. For this purpose, the side wall 38 is provided with air inlet openings and connections for the fan or fans 35. Provided within the shell 34 are elements in the form of support surfaces for mounting and aligning a heat exchanger 40, which is provided in the event that the air that passes through the evaporator 27 is to be heated.

The surface 39 of the shell 34 extends essentially parallel to the roof 19, although at a distance therefrom. Moreover, the shell 34 is considerably smaller than the distance between the side walls 17, so that air can flow freely arround the shell 34 within the air handling area 25. The air then enters the intakes 41 of the fan or fans 35, is possibly heated by the heat exchanger 40 within the shell 34, and is finally guided through the air discharge nozzles 32 into the inside compartment 10.

As shown in the embodiment of FIG. 2, the base plate 20 can have a central portion 42 that is spaced further from the essentially parallel roof 19 than are the remaining regions of the base plate 20. The unit 33 is advantageously disposed on the central portion 42.

However, it is also possible, as shown in the embodiment of FIG. 3, to offset the central portion 42 to the side, which results in more head room for one of the side entries, for example in the region of the left longitudinal member 13.

Despite the asymmetrical arrangement of the unit 33, the aperture 26, and hence the evaporator 27 can be disposed symmetrically, as shown in FIG. 3. Nevertheless, it is also possible to displace the aperture 26 and the evaporator 27 of the embodiment of FIG. 3 toward the right.

All of the embodiments assure that the conduit 29 for withdrawing the water of condensation has a sufficient fall or drop in order, for example, to be able to be conveyed away over one of the longitudinal members 13.

Although pursuant to the embodiment of FIG. 1 the fresh air inlet opening is directed at an angle towards the direction of travel, and is therefore disposed in the pressure head region, it is also possible to provide the fresh air inlet opening in the rear wall 16. The unit 33 is then merely shifted in the direction of the windshield 11. The filter 18 is associated with the fresh air inlet grill and, in the direction of flow, the partition 23 and the evaporator 27 are disposed immediately after the air inlet region that is disposed in the rear. A return air inlet opening 30, along with a flap 31, can also be provided in the rearwardly disposed inlet region.

The present invention is, of course, in no way restricted to the specific disclosure of the specification and drawing, but also encompasses any modifications within the scope of the appended claims.

What I claim is:

1. An apparatus for ventiating and air-conditioning driver compartments; the apparatus includes an air inlet area, downstream of which are provided an evaporator of an air-conditioning unit, and fan means; the apparatus can be secured to the roof construction of said driver compartment, and is provided with air outlet openings that lead to the latter; said apparatus further comprises:
   a base plate that is secured to said roof construction and closes off the space formed by the latter and said base plate, with said space accommodating said air inlet area, said evaporator, and said fan means; said base plate is provided with said air outlet openings; and
   a partition that is disposed in said space and extends at a right angle to said base plate; said partition extends transverse to the direction of flow of air from said air inlet area to said evaporator, and is associated with the latter; said partition is furthermore provided with an aperture, the dimensions of which are adapted to the air passage cross-section of said evaporator.

2. An apparatus according to claim 1, in which said partition is secured to said base plate.

3. An apparatus according to claim 1, in which the circumferential dimensions of said partition are initially greater than the overall cross-section of said space, with the edge of said partition being adapted to the cross-section of said roof construction only upon installation of said apparatus into the latter.

4. An apparatus according to claim 1, in which said partition, when viewed in the direction of flow of air from said air inlet area to said evaporator, is disposed immediately downstream of said air inlet area.

5. An apparatus according to claim 4, in which said base plate is provided with a return air inlet opening that communicates directly with said air inlet area; and which includes a flap for closing off said return air inlet opening.

6. An apparatus according to claim 5, which includes a fresh air inlet opening that communicates directly with said air inlet area.

7. An apparatus according to claim 6, which includes a filter disposed in said air inlet area downstream of said fresh air inlet opening.

8. An apparatus according to claim 7, in which said flap is a controllable flap that is associated with the outlet said of said filter, and with said return air inlet opening, for presetting the mixture ratio of fresh air to return air.

9. An apparatus according to claim 1, in which said roof construction is provided with a lining of foam material against which the free peripheral edge of said partition sealingly rests.

10. An apparatus according to claim 9, in which the peripheral edge of said base plate rests sealingly against said foam material lining.

11. An apparatus according to claim 1, in which said base plate is provided with a central portion that essentially extends parallel to a roof portion of said roof construction; said central portion is spaced at a greater distance from said roof portion than is the remainder of said base plate.

12. An apparatus according to claim 11, in which said central portion of said base plate is asymmetrically disposed.

13. An apparatus according to claim 1, which includes a unit disposed downstream of said partition in said space formed by said roof construction and said base plate; said unit includes a one-piece shell having an open base that is closed off by said base plate and communicates with said air outlet openings of the latter; said shell has a side wall having at least one air inlet opening and connections for said fan means so that the latter can communicate with said at least one air inlet opening of said shell; elements are provided within said shell for mounting a heat exchanger therein.

* * * * *